United States Patent
Mu et al.

(10) Patent No.: US 11,003,767 B2
(45) Date of Patent: May 11, 2021

(54) MULTI-LAYER DATA MODEL FOR SECURITY ANALYTICS

(71) Applicant: Beijing DiDi Infinity Technology and Development Co., Ltd., Beijing (CN)

(72) Inventors: Dongsheng Mu, San Ramon, CA (US); Liwei Ren, San Jose, CA (US)

(73) Assignee: Beijing DiDi Infinity Technology and Development Co., Ltd., Beijing (CN)

(*) Notice: Subject to any disclaimer, the term of this patent is extended or adjusted under 35 U.S.C. 154(b) by 145 days.

(21) Appl. No.: 16/106,386

(22) Filed: Aug. 21, 2018

(65) Prior Publication Data

US 2020/0065483 A1  Feb. 27, 2020

(51) Int. Cl.
*G06F 21/54* (2013.01)
*G06F 21/55* (2013.01)
*G06F 9/54* (2006.01)

(52) U.S. Cl.
CPC ............ *G06F 21/554* (2013.01); *G06F 9/542* (2013.01); *G06F 2221/034* (2013.01)

(58) Field of Classification Search
CPC ... G06F 21/554; G06F 9/542; G06F 2221/034
See application file for complete search history.

(56) References Cited

U.S. PATENT DOCUMENTS

| | | | |
|---|---|---|---|
| 10,102,374 B1* | 10/2018 | Cohen | G06F 21/568 |
| 10,706,144 B1* | 7/2020 | Moritz | G06F 21/55 |
| 2007/0136455 A1 | 6/2007 | Lee et al. | |
| 2013/0055385 A1 | 2/2013 | Antony et al. | |
| 2013/0298238 A1* | 11/2013 | Shah | G06F 21/554 726/23 |
| 2014/0096249 A1 | 4/2014 | Dupont et al. | |
| 2015/0040225 A1 | 2/2015 | Coates et al. | |
| 2017/0063902 A1 | 3/2017 | Muddu et al. | |
| 2018/0096149 A1* | 4/2018 | Morkovsky | H04L 63/1416 |
| 2019/0163598 A1* | 5/2019 | Harutyunyan | G06F 9/542 |

OTHER PUBLICATIONS

PCT International Search Report and the Written Opinion dated Apr. 2, 2019, issued in related International Application No. PCT/US2018/067981 (13 pages).
RAPID7. "Malware Incident response Steps on Windows, and Determining If the Threat Is Truly Gone." Mar. 21, 2017 (Mar. 21, 2017) Retrieved on Mar. 15, 2019 (Mar. 15, 2019) from <https://blog.rapid7.com/2017/03/21/responding-to-malware-events-on-windows-determining-if-the-threat-is-truly-gone/> entire document.

* cited by examiner

*Primary Examiner* — Nelson S. Giddins
*Assistant Examiner* — Alexander R Lapian
(74) *Attorney, Agent, or Firm* — Sheppard Mullin Richter & Hampton LLP

(57) ABSTRACT

Event information of a computing device is obtained. The event information characterizes events occurring at the computing device. Two or more of the events are grouped into an event group. The event group defines an activity. The event group is classified to classify the activity. The activity and one or more related activities are chained into a sequence. The sequence defines a behavior. Context is added to the sequence to determine a contextual behavior. A security threat is detected based on the contextual behavior.

19 Claims, 6 Drawing Sheets

MULTI-LAYER DATA MODEL FOR SECURITY ANALYTICS

TECHNICAL FIELD

The disclosure relates generally to detecting security threats to computing systems.

BACKGROUND

Computing systems may be subject to various security threats, such as data leakage, data corruption, unauthorized access, and/or unauthorized control. Detection of security threats based on detection of particular events at a computing system may require individual events and different combinations of events to be coded. Further, identifying individual events occurring at a computing system may not provide comprehensive information on what is occurring at the computing system. Such analysis of events may not provide comprehensive threat information.

SUMMARY

One aspect of the present disclosure is directed to a method for detecting security threats. The method may comprise: obtaining event information of a computing device, the event information characterizing events occurring at the computing device; grouping two or more of the events into an event group, the event group defining an activity; classifying the event group to classify the activity; chaining the activity and one or more related activities into a sequence, the sequence defining a behavior; adding context to the sequence to determine a contextual behavior; and detecting a security threat based on the contextual behavior.

Another aspect of the present disclosure is directed to a system for detecting security threats. The system may comprise one or more processors and a memory storing instructions. The instructions, when executed by the one or more processors, may cause the system to perform: obtaining event information of a computing device, the event information characterizing events occurring at the computing device; grouping two or more of the events into an event group, the event group defining an activity; classifying the event group to classify the activity; chaining the activity and one or more related activities into a sequence, the sequence defining a behavior; adding context to the sequence to determine a contextual behavior; and detecting a security threat based on the contextual behavior.

Another aspect of the present disclosure is directed to a non-transitory computer readable medium for detecting security threats. The non-transitory computer-readable medium may comprise instructions that, when executed, cause one or more processors to perform: obtaining event information of a computing device, the event information characterizing events occurring at the computing device; grouping two or more of the events into an event group, the event group defining an activity; classifying the event group to classify the activity; chaining the activity and one or more related activities into a sequence, the sequence defining a behavior; adding context to the sequence to determine a contextual behavior; and detecting a security threat based on the contextual behavior.

In some embodiments, the events may include operating system level events.

In some embodiments, the two or more of the events may be grouped into the event group based on a common identifier associated with the two or more of the events. The common identifier may be determined based on a process identifier and a device identifier.

In some embodiments, the event group may be classified based on a pattern recognition.

In some embodiments, the activity and the one or more related activities may be chained into the sequence in a graph.

In some embodiments, adding the context to the sequence may include adding external information to the graph.

In some embodiments, detecting the security threat based on the contextual behavior may include detecting the security threat based on at least a portion of the graph.

In some embodiments, the event information may be obtained from an event collector agent running on the computing device.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein improve technologies for detecting security threats. By using a multi-layer data model for analyzing events and associated information, a comprehensive information on what is occurring at a computing system may be generated. The multi-layer data model may provide for robust and flexible security threat detection. The multi-layer data model may provide for detection of security threats using high-level view, which is less prone to obfuscation of data attacks. The multi-layer data model may be used to fill in missing links between different pieces of events to construct comprehensive threat information and identify threats. The multi-layer data model may be modularized to divide tasks among different entities. Modularization of the multi-layer data model may facilitate independent changes, updates, or optimization of different layers.

Figure 1:
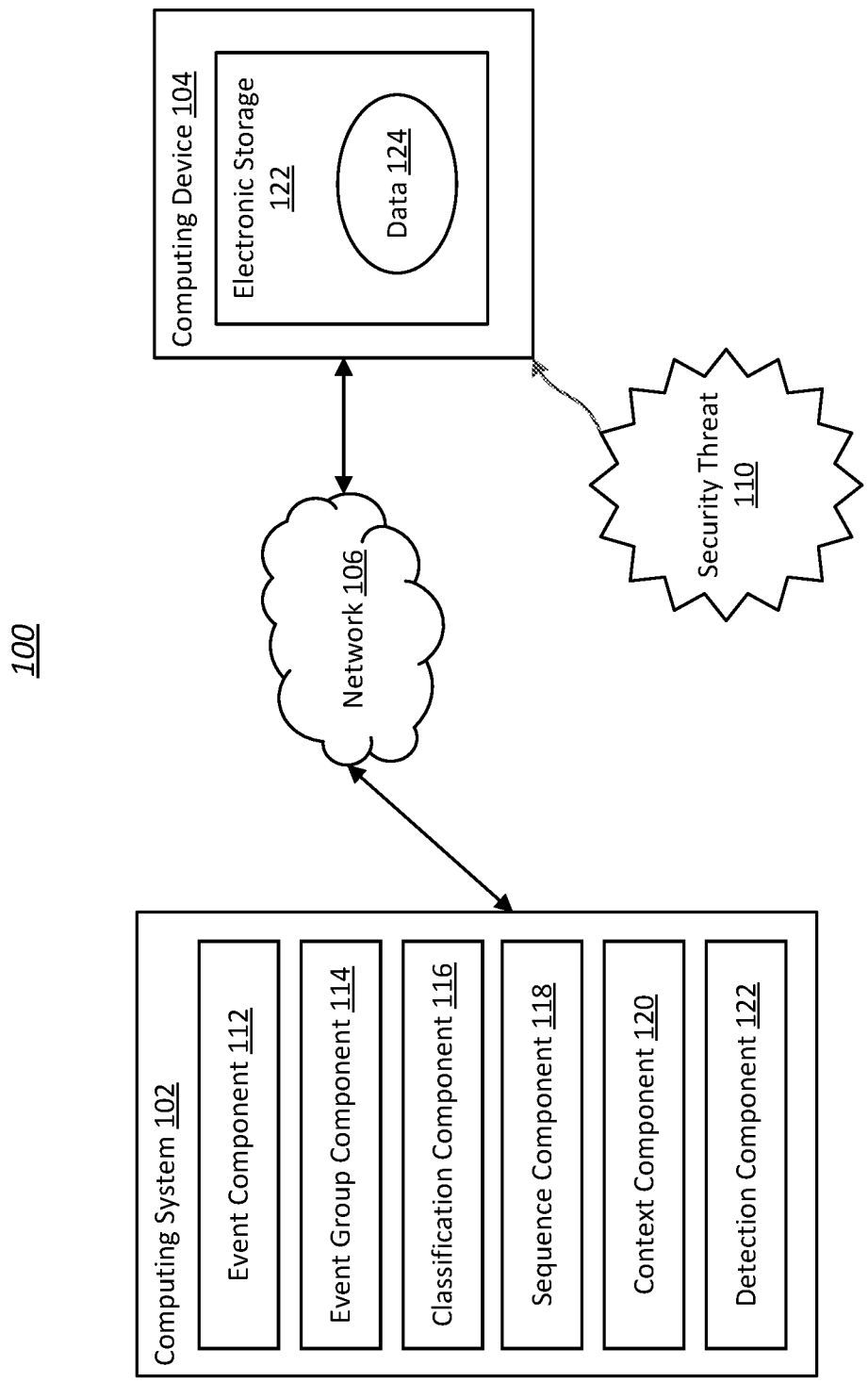
FIG. 1 illustrates an example environment for detecting security threats, in accordance with various embodiments of the disclosure.

FIG. 1 illustrates an example environment 100 for detecting security threats, in accordance with various embodiments. The example environment 100 may include a computing system 102 (e.g., a server) and a computing device 104 (e.g., a client device, desktop, laptop, smartphone, tablet, mobile device). The computing system 102 and the computing device 104 may include one or more processors and memory (e.g., permanent memory, temporary memory). The processor(s) may be configured to perform various operations by interpreting machine-readable instructions stored in the memory. One or both of the computing system 102 and the computing device 104 may include other computing resources or have access (e.g., via one or more connections/networks) to other computing resources.

The computing system 102 may include an event component 112, an event group component 114, a classification component 116, a sequence component 118, a context component 120, and a detection component 122. The computing system 102 may include other components. The computing system 102 and the computing device 104 may be connected through one or more networks (e.g., a network 106). The computing system 102 and the computing device 104 may exchange information using the network 106. The computing system 102 and the computing device 104 may communicate over the network 106 using one or more communication protocols. The computing system 102 may be a server of the network 106 and the computing device 104 may be a node of the network 106.

While the computing system 102 and the computing device 104 are shown in FIG. 1 as single entities, this is merely for ease of reference and is not meant to be limiting. One or more components or functionalities of the computing system 102 or the computing device 104 described herein may be implemented in a single computing device or multiple computing devices. For example, one or more components/functionalities of the computing system 102 may be implemented in the computing device 104 or distributed across multiple computing devices. For instance, the computing device 104 may represent a computing platform, such as an email system and/or a file server, and the components/functionalities of the computing system 102 may be implemented within the computing platform or in one or more other computing devices.

The computing device 104 may include an electronic storage 122. The electronic storage 122 may refer to a device for storing information, such as information defining computer files. The electronic storage 122 may include one or more storage media in which information may be stored. For example, the electronic storage 122 may include optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), or other electronically readable storage media. The electronic storage may be part of the computing device 104 (e.g., integrated into the computing device 104) or removably coupled to the computing device 104.

The electronic storage 122 may store data 124 and other information. The data 124 may refer information that is formatted for storage or use by one or more computing devices. For example, the data 124 may include one or more electronic files, executable programs, configuration files, program settings, registry information, or other information stored or used by computing devices.

The computing device 104 may be subject to a security threat 110. The security threat 110 may refer to potential unauthorized action, occurrence, or event relating to the computing device 104. For example, the security threat 110 may include the possibility of the data 124 (or a portion of the data 124) being subject to unauthorized access or modification, such as by an unauthorized user or an unauthorized program that exploits vulnerabilities of the computing device 104, another computing device connected to the computing device 104, or the network 106. For instance, the security threat 110 may include an unauthorized user attempting to access the data 124 or a malicious program running on the computing device 104 attempting to destroy or steal the data 124. As another example, the security threat 110 may include an unauthorized user or an unauthorized program attempting to install and/or run unauthorized programs on the computing device 104. As yet another example, the security threat 110 may include an unauthorized user or an unauthorized program attempting to access an internal network of the computing device 104. Other types of security threats are contemplated.

The computing device 104 or another computing device coupled to the computing device 104 may generate event information of the computing device 104 and provide the event information of the computing device 104 to the computing system 102 over the network 106. The computing device 104 or another computing device coupled to the computing device 104 may run one or a combination of software, program, process, agent (program that acts for one or more users or other program(s), event collector agent that generates and provide event information for one or more users or other program(s)), or other tools to track events that occur at the computing device 104. Such tool(s) may monitor the computing device 104 to collect information about events, such as occurrences of events, processes involved in events, changes in the computing device 104 or the data 124 caused by events, or other information relating to events. Such information may be referred to event information. An event may refer to an action or an occurrence that happens at a computing device. An event may occur based on user action, a process running on the computing device, communication with or from another computing device, or based on other information or factors. An event may cause a change in the computing device. For example, an event occurring at the computing device 104 may cause a change in how the computing device 104 operates or a change in information stored or used by the computing device 104. For instance, events may include a read data event, a write data event, a call event, an open network connection event, a change network connection event, or other events. Events may include atomic events. An atomic event may refer to an event that is not divisible into sub-events. For example, events may include operating system level events.

One or more events may be associated with a process. For example, a process running on a computing device may cause one or more events to occur and the event(s) may be associated with the process. The process associated with events may be identified by a process identifier. Event(s) associated with a process may also be associated with a device. For example, a process may cause one or more events to occur at the computing device 104 and the event(s) may be associated with the computing device 104. As another example, a process causing one or more events may run on the computing device 104 and the event(s) may be associated with the computing device 104. A device associated with event(s) may be identified by a device identifier.

Event information may characterize events occurring at the computing device 104. For example, event information may include information relating to the events, such as occurrences of events, process identifiers associated with events, device identifiers associated with events, timing of events, or other information related to events. The tool(s) running on the computing device 104 may observe and record information relating to some or all event running on the computing device 104. In some embodiments, the event information may be generated or provided in the form of one or more logs (e.g., event log). In some embodiments, such tool(s) may act with a certain degree of autonomy to collect and generate event information of the computing device 104. Such tool(s) may be autonomous. Such tool(s) may work independently or work with other tools. Such tool(s) may not require any interaction of a user of the computing device 104. Such tool(s) may invoke one or more tasks on the computing device 104 to generate event information.

The event information of the computing device 104 may be periodically generated. The event information of the computing device 104 may be generated at regular intervals or irregular intervals. The event information of the computing device 104 may be generated based on a detection of relevant events/processes. The event information of the computing device 104 may be generated based on a scan of relevant events/processes. The event information of the computing device 104 may be generated based on a request for the event information. Other generation of event information of the computing device 104 are contemplated.

The event information of the computing device 104 may be periodically provided to the computing system 102. The event information of the computing device 104 may be provided to the computing system 102 at regular intervals or irregular intervals. The event information of the computing device 104 may be provided to the computing system 102 based on a detection of relevant events/processes. The event information of the computing device 104 may be provided to the computing system 102 based on a scan of relevant events/processes. The event information of the computing device 104 may be provided to the computing system 102 based on a request for the event information. Other provision of event information of the computing device 104 are contemplated.

The provision of the event information of the computing device 104 to the computing system 102 may enable detection of security threats to the computing device 104 (e.g., the security threat 110) to be performed at the computing system 102. That is, security threat detection may occur remotely from the computing device 104, such as in the cloud. In some embodiments, event information from one or multiple computing devices (e.g., the computing device 104) may be aggregated for analysis. In embodiments in which one or more functionalities of the computing system 102 are implemented in the computing device 104, the event information of the computing device 104 may be used by the computing device 104 to perform security threat detection.

Event information may be used to trace history of events. Event information may be used to build a profile of events occurring at one or more computing devices and perform analysis to detect security threats (e.g., the security threat 110). Event information may be analyzed using a multi-layer data model. A multi-layer data model may use low-level events characterized by the event information to build a high-level behavior associated with a computing device to detect a security threat for the computing device. That is, processing of the event information through the multi-layer data model may facilitate high level behavior analysis based on low level events. The high level behavior analysis may be used to detect security threats. Remedial measures may be suggested or taken based on detection of the security threats.

The event component 112 may be configured to obtain event information of the computing device 104. As explained above, the event information may characterize events occurring at the computing device 104. Obtaining event information may include one or a combination of accessing, acquiring, analyzing, determining, examining, identifying, loading, locating, opening, receiving, retrieving, reviewing, storing, or otherwise obtaining the event information. The event component 112 may obtain event information of the computing device 104 from a hardware component, such as an electronic storage, or a software component, such as a process running on a computing device. For example, the event component 112 may obtain event information of the computing device 104 from an event collector agent running on the computing device 104.

The event component 112 may obtain event information of the computing device 104 from the computing device 104 or another computing device coupled to the computing device 104. The event component 112 may obtain the event information directly from the computing device that determined the event information or through one or more intermediary devices (e.g., routers, modems, servers). The event information may be pushed to the event component 112. The event information may be pulled by the event component 112.

The event group component 114 may be configured to group two or more of the events characterized by the event information into an event group. That is, the event group component 114 may group multiple events into a single event group. The event group may define an activity. An activity may refer to a function or a job performed by a computing device. One or more events may occur within an activity. For example, an activity of the computing device 104 may include one or more actions or occurrences happening at the computing device 104. An activity may be associated with a process. For example, a process running on a computing device may cause an activity (including one or more events) to occur and the activity may be associated with the process, which may be identified by a process identifier. Individual activities may start with a process creation and terminate with a process termination. An activity may also be associated with a device. For example, a process may cause an activity to occur at the computing device 104 and the activity may be associated with the computing device 104. As another example, a process causing an activity may run on the computing device 104 and the activity may be associated with the computing device 104. The device with which an activity is associated may be identified by a device identifier.

The event group component 114 may group multiple events into an event group based on the event information or other information. For example, the event group component 114 may group multiple events into an event group based on a common identifier associated with the multiple events. A common identifier may include an identifier shared by multiple events. Such identifiers may be determined based on one or a combination of a process identifier, a device identifier, or other information. For example, the events may be identified for grouping by the associated process identifiers, and the event group component 114 may analyze the event information to identify events that are associated with the same process identifier, and group those events with the same process identifier into an event group. As another example, the events may be identified for grouping by the associated process identifiers and associated device identifiers, and the event group component 114 may analyze the event information to identify events that are associated with the same process identifier and same device identifier, and group those events with the same process identifier and same device identifier into an event group. In some embodiments, the comparison of the identifiers may be performed based on hash of the identifiers, such as hash of process identifier, hash of device identifier, or hash of a combination of process identifier and device identifier. The comparison of the identifiers may be performed based on hash of executables that produce the events.

The use of device identifier along with process identifier to identify events for grouping may enable the event group component 114 to distinguish between events occurring at different computing devices (e.g., endpoints). The process identifiers and the device identifiers of processes may be used to generate unique identifiers for processes running at different computing devices. For example, different processes running at different computing device may be identified by the same process identifier. However, the different computing devices may be identified by different device identifiers. Using identifiers based on both process identifiers and device identifiers may enable the event group component 114 to distinguish events from the processes that have the same process identifier while running on different computing devices.

An event group may include a series of events produced during a process life between start and termination of a process. For example, an activity on the computing device 104 may include a zipping activity. The zipping activity may start based on the operating system starting a process (e.g., ZIP.exe), loading one or more library files for the process, reading an input file, compressing data in the input file, writing the compressed data into a temporary file, renaming the completed temporary file to a final name, and terminating the process. These events for the zipping activity may be grouped into an event group to define the zipping activity. The grouped events may provide comprehensive details of information relating to the process, such as details of registry, library, data file, parent/child process, network, or other information relating to the process.

The grouping of events may be performed by the event group component 114 without understanding the purpose of the associated process. That is, the event group component 114 may group events into an event group defining an activity without understanding the semantic meaning of the activity. For example, referring to the example of the zipping activity, the event group component 114 may group events into an activity of zipping without understanding that the events are part of a zipping operation.

The classification component 116 may be configured to classify an event group to classify an activity defined by the event group. Classification of an event group or an activity may include interpretation of the event group or the activity. That is, the classification component 116 may classify an event group to interpret what the activity has done, such as the inputs to the activity and the outputs of the activity. The classification component 116 may label the event group or the activity to insert understanding of the activity into event information analysis. For example, the classification component 116 may label an activity as zipping a file, downloading a file, uploading a file, encrypting information, compressing data, or other computer operations.

The classification component 116 may classify an event group based on pattern recognition or other information. For example, the classification component 116 may use pattern recognition based on a listing of recognizable hashes. For instance, the classification component 116 may maintain a library of executables with recognizable hashes, and may classify an event group based on matching the hash of the event group to a recognizable hash. In some embodiments, the pattern recognition may be facilitated by user classification. For example, if the classification component 116 does not recognize a hash of the event group, a user may be prompted to classify the event group or the activity. The received user classification may be added to the library of recognizable hashes. In some embodiments, the classification component 116 may be trained to recognize various executables, as well as their variants. In some embodiments, the hashes may include SHA-256 hashes, fuzzy hashes, or other hashes.

The sequence component 118 may be configured to chain multiple activities into a sequence. The sequence component 118 may chain an activity and one or more related activities into a sequence. A related activity may refer to an activity that is connected to another activity. An activity may be related to another activity based on commonalities in information or parameters associated with the activities or functioning of the activities. A sequence of activities may define a behavior. A behavior may refer to a way in which functions or jobs performed by a computing device operate in conjunction with other functions or jobs. A behavior may represent a high-level view of low-level events within activities. The sequence component 118 may organize interpreted activities in a timely order into a behavior. For example, a behavior for transmitting a file from a file management system may include the following activities in a sequence: checking out the file (e.g., downloading data), compressing the file (e.g., compressing data), and transmitting the compressed file (e.g., uploading compressed data to email server).

In some embodiments, the sequence component 118 may chain activities into a sequence based on the activities being related to the same data or dataset or other commonalities of information or parameters associated with the activities. For example, the sequence component 118 may chain activities into a sequence based on inputs and outputs of activities. For instance, a sequence of activities may include a first activity, a second activity, and a third activity. Individual activities may have one or more inputs and one or more outputs. An output of the first activity may be used as an input to the second activity, and an output of the second activity may be used as an input to the third activity. Based on following the movement of data (determined based on matching inputs and outputs of activities), a sequence may be generated with the second activity following the first activity, and the third activity following the second activity in the sequence. For instance, referring to the example behavior for transmitting a file from a file management system, the movement of the file or data within the file may be tracked to chain the activities of checking out the file, compressing the file, and transmitting the compressed file.

In some embodiments, the matching of an output of an activity to an input of another activity may be performed based on hashes of the input and output or the corresponding data, such as hash of a file being affected by the activities or underlying data included within the input and output. In some embodiments, the matching of an output of an activity to an input of another activity may be performed based timing of activities. For example, the activities may be ordered based on the timing of activities to determine which activities may provide their outputs as inputs to other activities or which activities may use the outputs of other activities as their inputs. As another example, a given activity may be associated with a particular time duration to produce one or more outputs and the time duration may be used to identify activities that may potentially use the outputs of the given activity as input or to filter out activities that could not use the outputs of the given activity as input.

In some embodiments, the sequence component 118 may chain activities into a sequence based on user input. For example, if the sequence component 118 cannot find commonalities between different activities for sequencing, a user may be prompted to identify or order activities to be chained within a sequence. The user identification or ordering of activities in a sequence may be tracked to identify parameters for identifying or ordering activates. For example, one or more learning capabilities may be used to train and update training of the sequence component 118 in identifying activities for inclusion in a sequence or the ordering of activities within a sequence.

In some embodiments, multiple activities (e.g., an activity and one or more related activities) may be chained into a sequence in a graph. The nodes of the graph may represent activities and the edges of the graph may represent connections between the activities. For example, a graph for transmitting a file from a file management system may include a node for checking out the file, a node for compressing the file, and a node for transmitting the compressed filed. The edges between the nodes may represent one or more commonalities between the nodes, such as a hash of an output of a node matching a hash of an input to another node. That is, hashing of the relevant file or data within the file may be used to connect different nodes/activities together within the graph. The graph may be a directed graph, with the direction of edges representing movement of data through the graph. The nodes and edges of the graph may provide a graphical representation of a behavior defined by a sequence of activities.

The context component 120 may be configured to add context to the sequence to determine a contextual behavior. A contextual behavior may refer to behavior that has been augmented with contextual information. A contextual behavior may represent a high-level view of low-level events within activities which has been decorated with information from outside the event collection system. Context may refer to information on circumstances of a behavior defined by a sequence of activities. For example, context may refer to one or more settings in which activities of the behavior were carried out or things that were affected by the behavior. Context may refer to information relating to the behavior that is outside the event information or the event collection system.

For example, referring to the example behavior for transmitting a file from a file management system, context may include information on whether the file includes confidential or classified information, the level of confidentiality or classification of the information, originator or users of the file or information within the file, copyright or other protective markings inside the file, where the file was stored, where the file is sent, users of the device from which the file was received, users of the device to which the file is sent, the type of information contained within the file (e.g., text document, video file, picture, source code), or other information relating to transmission of the file.

In some embodiments, context may be determined from analysis of the relevant file or data. For example, referring to the example behavior for transmitting a file from a file management system, context may be determined based on analysis of the file, such as keyword searching or file hashing.

In some embodiments, context may be determined from external information sources. For example, referring to the example behavior for transmitting a file from a file management system, external network sources may be used to determine the identity of the receiver of the file transmission (e.g., IP address), whether the receiver of the file transmission is an external destination (e.g., outside a particular organization from which the file is being sent), such as based on a determination that the file is being sent to a server, a gateway, or some other destination outside the organization, or other information relating to the transmission of the file. This information may be collected from sources other than the device on which the behavior is observed. That is, information external to the event information may be used to enrich the behavior with context.

In some embodiments, context may be determined from security systems. For example, one or more security systems overseeing the data 124 of the computing device 104 may generate security information (e.g., likelihood of security breach, data leakage score, whether a user/device has permission for the behavior) for the relevant data and such security information may be added as context for the behavior.

In some embodiments, adding context to a sequence may include adding external information to a graph providing a graphical representation of the behavior. For example, external information may be added to one or more nodes within the graph or to one or more edges within the graph. In other words, external information may be used to decorate the graph. The decorated graph may represent a comprehensive high-level view of low-level events within activities, with information from both internal and external sources.

The detection component 122 may be configured to detect a security threat based on the contextual behavior. The contextual behavior may enable the detection component 122 to use one or more high-level rules to detect a security threat. That is, rather than using low-level rules to detect a security threat based on events occurring at the computing device 104, the detection component 122 may analyze the contextual behavior using high-level rules to detect the security threat 110. A low-level rule may specify a combination or a sequence of low-level events that may indicate a security threat. A high-level rule may specify high-level behaviors that may indicate a security threat. For example, a high-level rule may indicate a security threat based on the contextual behavior showing that a child process has higher privilege than a parent process. The detection component 122 may analyze the process heritage to determine whether there is an increase in privilege from a parent process to a child process. As another example, a high-level rule may indicate a security threat based on the contextual behavior showing that a user has retrieved confidential information from an internal webpage of an organization and has sent this confidential information via a chat to someone outside the organization. Other types of high-level rules are contemplated.

Thus, rather than matching individual events or combinations of events to a security threat, the detection component 122 may match the contextual behavior or a portion of the contextual behavior to a security threat. Such detection of security threat may provide for more flexible and comprehensive security threat detection than low-level security threat detection. In some embodiments, the contextual behavior may be used to generate a security threat metric (e.g., level of security threat, security threat score) and the detection component 122 may detect a security threat based on the value of the security threat metric, such as based on the value being above a threshold level or a threshold score.

In some embodiments, one or more high-level rules used by the detection component 122 may be configured based on known patterns of security threats, such as known attack patterns. In some embodiments, one or more high-level rules used by the detection component 122 may be configured using a learning technique that changes with additional data relating to security threats. In some embodiments, the detection component 122 may categorize or rank detected security threats based on severity of the threats. Such categorization or ranking of security threats may enable prioritization of more severe threats over less severe threats for analysis or resolution.

In some embodiments, the detection component 122 may detect a security threat based on the contextual behavior by using at least a portion of the graph providing a graphical representation of the contextual behavior. Portion(s) or the entire graph may be used to understand the contextual behavior. In some embodiments, portion(s) or the entire graph may be analyzed in the direction of activities (e.g., analyzed in time-order). In some other embodiments, portion(s) or the entire graph may be analyzed in the opposite direction of activities (e.g., analyzed in reverse time-order). The detection component 122 may match portion(s) or the entire graph to one or more graphs for security threats. For example, the detection component 112 may retrieve an attack graph stored in a library and compare the attack graph to the graph of contextual behavior to determine whether they are same, the extent to which they are the same or similar, or whether at least a portion of the graph of contextual behavior is the same as or similar to the attack graph. For example, the detection component 122 may detect a threat based on matching an attack graph to a sub-graph of the graph of contextual behavior or finding that a sub-graph of the graph of contextual behavior is similar to an attack graph.

Identification of security threats based on contextual behavior (e.g., graph of contextual behavior) may be more robust and flexible than identification based on event matching. For example, tools that identify security threats based on specific events or specific combinations of events may be easily by-passed by using non-specified events. Such tools may also be complicated to code as numerous combinations of events may need to be coded. Identification of security threats based on contextual behavior, on the other hand, enables detection of threats based on the identified behavior, in addition to external information, which may provide a more robust (e.g., less prone to obfuscation of cyber attacks) and flexible (e.g., high-level rule can detect different attacks) threat detection.

Remedial measures may be suggested or taken based on detection of security threats. Based on detection of a threat, information relating to events, activity, behavior, or contextual behavior may be analyzed to determine what actions may be taken to reduce or remove the threat. For example, events in a relevant event group may be tagged for further review or analysis by an investigator. The investigator may include a human investigator or a computing tool. For example, an investigator may be alerted via one or more messages (e.g., warning message, alert tag) to the security threat and the relevant events or associated information that led to the detection of the threat.

Investigation of the events may utilize information processed by the multi-layer data model, such as grouping of events, classification of activity, sequence of activities, behavior, context added to behavior, contextual behavior, or a graph defining the contextual behavior. Different layers of the multi-layer data model may provide different information regarding the security threat, such as who, what, when, where, and why relating to various events, grouping of events, or context of events. Such information may be used to take or suggest steps to take in response to the security threat. For example, based on information relating to a security threat indicating presence of malicious program (e.g., malware, virus) running on a computing device, the malicious program may be stopped or removed to stop the security threat. As another example, based on information relating to a security threat indicating that a user is responsible for a security threat (e.g., a user leaked a confidential document), the user may be restricted from accessing certain information, suspended from further access to a computing system of an organization, placed on leave, or otherwise punished. As further example, based on information relating to a security threat indicating that a file has been leaked or damaged, the amount of leakage or damage may be estimated and steps to stop the leakage or repair the damage may be provided or taken. Preventative actions may be taken based on the investigation. Preventative actions may include actions that may reduce the likelihood of future security threats or potential harms arising from threats. Other investigation and resolution of threats are contemplated.

Figure 2:
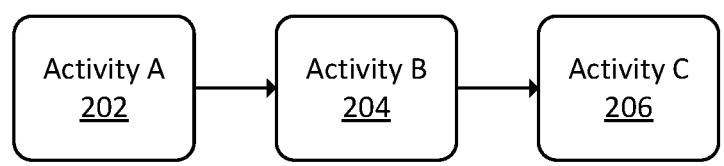
FIG. 2 illustrates example sequences of activities, in accordance with various embodiments of the disclosure.
Figure 2:
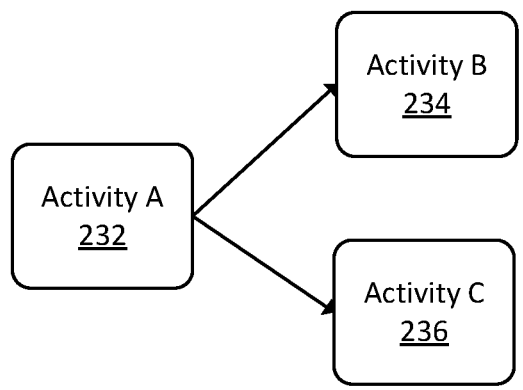
Figure 2:
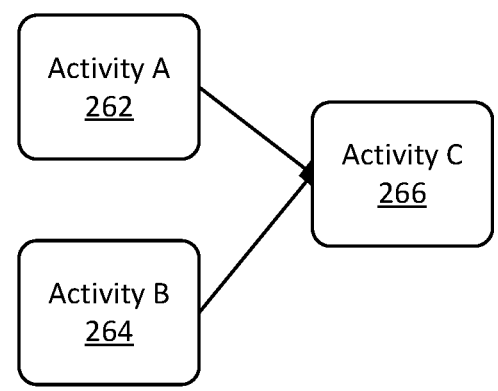

FIG. 2 illustrates example sequences of activities 200, 230, 260, in accordance with various embodiments of the disclosure. The sequences 200, 230, 260 may individually form a graph, with different activities represented by nodes and connections between activities represented by edges. The sequences 200, 230, 260 may define different behaviors. Different nodes or edges of the graphs representing the sequences 200, 230, 260 may be augmented with contextual information.

The sequence 200 may include an activity A 202, an activity B 204, and an activity C 206. The activity A 202, the activity B 204, and the activity C 206 may be related to each other. The activity A 202, the activity B 204, and the activity C 206 may be chained into a sequence where the activity B 204 follows the activity A 202, and the activity C 206 follows the activity B 204. The sequence 200 may define a behavior in which the activity A 202, the activity B 204, and the activity C 206 occur in order.

The sequence 230 may include an activity A 232, an activity B 234, and an activity C 236. The activity A 232, the activity B 234, and the activity C 236 may be related to each other. The activity A 232, the activity B 234, and the activity C 236 may be chained into a sequence where the activity B 234 and the activity C 236 follow the activity A 232. The sequence 230 may define a behavior in which the activity B 234 and the activity C 236 occur in parallel following the activity A 232.

The sequence 260 may include an activity A 262, an activity B 264, and an activity C 266. The activity A 262, the activity B 264, and the activity C 266 may be related to each other. The activity A 262, the activity B 264, and the activity C 266 may be chained into a sequence where the activity C 266 follows the activity A 262 and the activity B 264. The sequence 260 may define a behavior in which the activity A 262 and the activity B 264 occur in parallel, followed by the activity C 266.

Figure 3:
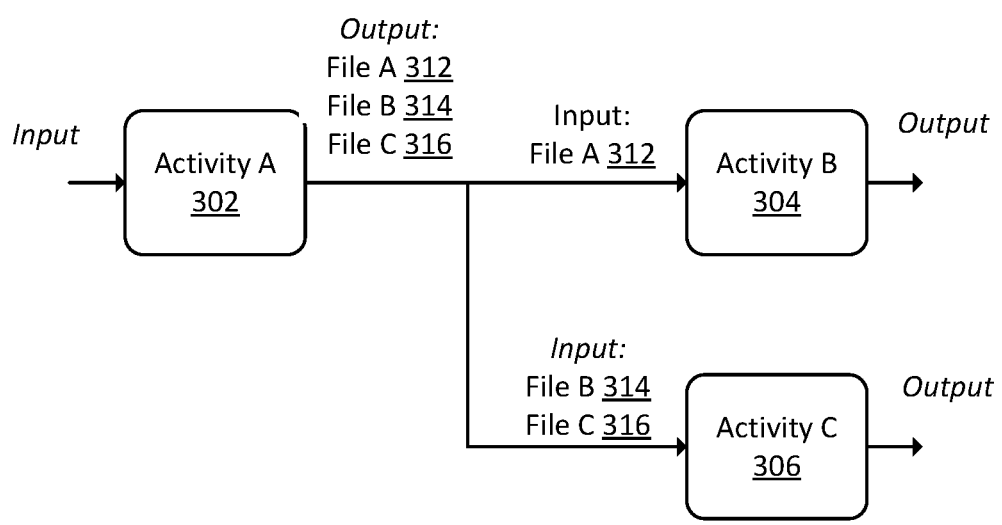
FIG. 3 illustrates example inputs and outputs of activities within a sequence, in accordance with various embodiments of the disclosure.

FIG. 3 illustrates example inputs and outputs of activities within a sequence 300, in accordance with various embodiments of the disclosure. The sequence 300 may include an activity A 302, an activity B 304, and an activity C 306. The activity A 302, the activity B 304, and the activity C 306 may be related to each other based on, for example, data moving between the activities 302, 304, 306. For example, individual activities 302, 304, 306 may include inputs and outputs. A portion or the entire output of one activity may be provided as input to another activity. For instance, the output of the activity A 302 may include a file A 312, a file B 314, and a file C 316. The file A 312 may be provided as input to the activity B 304 while the file B 314 and the file C 316 may be provided as input to the activity C 306. Hash may be used to confirm that output of one activity is input to another activity. The movement of data or file among the activities 302, 304, 306 may be used to determine connections (edges) between different activities (nodes) 302, 304, 306, which may result in chaining of the activities 302, 304, 306 into a graph.

Figure 4:
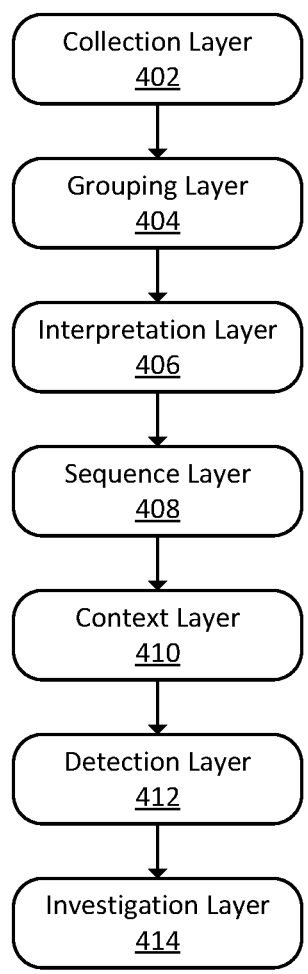
FIG. 4 illustrates an example flow diagram of a multi-layer data model, in accordance with various embodiments of the disclosure.

FIG. 4 illustrates an example flow diagram of a multi-layer data model 400, in accordance with various embodiments of the disclosure. The multi-layer data model 400 may be used to detect security threats using high-level views of low-level events. The multi-layer data model 400 may use low-level events to build a high-level behavior associated with a computing device to detect a security threat for the computing device. Low-level events may be processed through the multi-layer data model 400 to facilitate a high level behavior analysis of occurrences at the computing device. The multi-layer data model 400 may be used to describe events, activities, and behaviors to facilitate threat investigator's analysis of threats and construction of a comprehensive view of threats. The high level behavior analysis may be used to detect threats. Remedial measures may be suggested or taken based on detection of the threats.

Individual layers of the multi-layer data model 400 may depend on the layer above it for input. That is, output of a higher layer may be provided as input to a lower layer. Data may be processed or assembled automatically or near automatically by movement of inputs and outputs among two or more of the layers. Individual layers may perform one or more functions (a grouping of function(s)) based on the input to provide the output.

The multi-layer data model 400 may include a collection layer 402, a grouping layer 404, an interpretation layer 406, a sequence layer 408, a context layer 410, a detection layer 412, and an investigation layer 414. The collection layer 402 may include data collection, such as collection of events sensed at computing devices or endpoints. Agents running at computing devices or endpoints may sense events (e.g., operating system level events) for collection and provision.

The grouping layer 404 may group multiple events into an event group based on data collected by the collection layer 402. The event group may define an activity. The events may be grouped based on one or a combination of processor identifiers or device identifiers associated with the events. An event group may provide comprehensive details of information relating to a process, such as details of registry, library, data file, parent/child process, network, or other information relating to the process.

The interpretation layer 406 may classify or interpret the event groups formed by the grouping layer 404. That is, the interpretation layer 406 may classify or interpret what has been done by an activity defined by an event group. Classifying or interpreting an activity may include labeling the activity or otherwise recognizing the activity. The interpretation layer 406 may use pattern recognition (e.g., matching an executable hash to a specific activity within a library of executables) for interpretation/classification.

The sequence layer 408 may chain activities classified or interpreted by the interpretation layer 406 into a sequence. A sequence may define a behavior. The sequence layer 408 may determine connection between activities based on movement of data or file, such as based on outputs of activities being used as inputs to other activities. The sequence may be represented using nodes and edges of a graph, where nodes represent activities and edges represent connections between activities.

The context layer 410 may add context to the sequence built by the sequence layer 408. Such addition of context may generate a contextual behavior. A contextual behavior may represent a high-level view of low-level events within activities which has been decorated with information outside the event collection system. Context may include information from external sources which may enrich behavior data from the sequence layer 408. Information may be added to nodes or edges to decorate the graph.

The detection layer 412 may detect a security threat based on a contextual behavior generated by the context layer 410. The detection layer 412 may detect a threat based on a high-level view of low-level events that has been decorated with external information. The detection layer 412 may utilize one or a combination of security knowledge, high-level rule, or machine learning model to identify threats, such as attacks and data leakage. The detection layer 412 may compare graphs of threats to the graph of contextual behavior to detect security threats.

The investigation layer 414 may analyze a security threat detected by the detection layer 412. The investigation layer 414 may include automated analysis of the threat or investigation of the threat by a human investigator. The investigation layer 414 may use information collected, processed, and analyzed by different layers within the multi-layer data model 400 to identify the security threat and suggest or take remedial measures.

Individual layers of the multi-layer data model 400 may include a set of algorithms that operate within the layers. The set of algorithms may perform one or more functions corresponding to the individual layers. Individual layers may receive information from only the previous layer. Individual layers may operate without understanding of how the prior layers operated or how following layers may operate. Given such separation and independent operation of layers, individual layers of the multi-layer data model 400 may be modularized. For example, tasks of different layers may be divided among different tools or persons. Additionally, the modularization of layers may enable individual layers to be modified (e.g., changed, updated, improved) independently of each other. For example, individual layers of the multi-layer data model 400 may be individually optimized without impacting operations of other layers, as long as individual layers are able to use as input the output of the preceding layers and the following layers are able to use as inputs the outputs of the individual layers.

One or more functions of the individual layers of the multi-layer data model 400 may be performed by one or more components of the computing system 102 shown in FIG. 1. For example, one or more functions of the collection layer 402 may be performed by the event component 112. One or more functions of the grouping layer 404 may be performed by the event group component 114. One or more functions of the interpretation layer 406 may be performed by the classification component 116. One or more functions of the sequence layer 408 may be performed by the sequence component 118. One or more functions of the context layer 410 may be performed by the context component 120. One or more functions of the detection layer 412 may be performed by the detection component 122. One or more functions of the investigation layer 414 may be performed by one of the shown components of the computing system 102, other component(s) of the computing system 102, or by one or more users.

Figure 5:
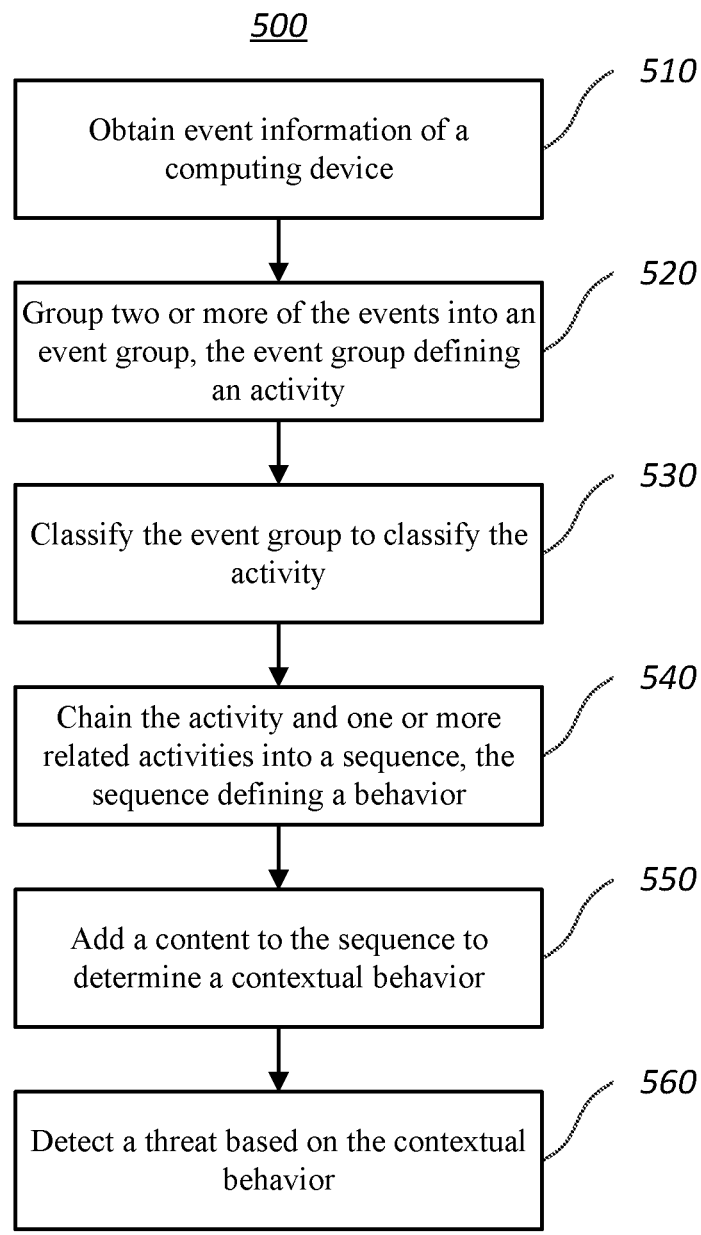
FIG. 5 illustrates a flow chart of an example method, in accordance with various embodiments of the disclosure.

FIG. 5 illustrates a flowchart of an example method 500, according to various embodiments of the present disclosure. The method 500 may be implemented in various environments including, for example, the environment 100 of FIG. 1. The operations of the method 500 presented below are intended to be illustrative. Depending on the implementation, the method 500 may include additional, fewer, or alternative steps performed in various orders or in parallel. The method 500 may be implemented in various computing systems or devices including one or more processors.

With respect to the method 500, at block 510, event information of a computing device may be obtained. The event information may characterize events occurring at the computing device. At block 520, two or more of the events may be grouped into an event group. The event group may define an activity. At block 530, the event group may be classified to classify the activity. At block 540, the activity and one or more related activities may be chained into a sequence. The sequence may define a behavior. At block 550, context may be added to the sequence to determine a contextual behavior. At block 560, a threat may be detected based on the contextual behavior.

One or more blocks of the method 500 may be performed by one or more computer components that are the same as or similar to the components of the computing system 102 shown in FIG. 1. For example, the block 510 may be performed by a computer component the same as or similar to the event component 112. The block 520 may be performed by a computer component the same as or similar to the event group component 114. The block 530 may be performed by a computer component the same as or similar to the classification component 116. The block 540 may be performed by a computer component the same as or similar to the sequence component 118. The block 550 may be performed by a computer component the same as or similar to the context component 120. The block 560 may be performed by a computer component the same as or similar to the detection component 122.

One or more blocks of the method 500 may correspond to functions performed within one or more layers of the multi-layer data model 400 shown in FIG. 4. For example, the block 510 may correspond to function(s) performed within the collection layer 402. The block 520 may correspond to function(s) performed within the grouping layer 404. The block 530 may correspond to function(s) performed within the interpretation layer 406. The block 540 may correspond to function(s) performed within the sequence layer 408. The block 550 may correspond to function(s) performed within the context layer 410. The block 560 may correspond to function(s) performed within the detection layer 414.

Figure 6:
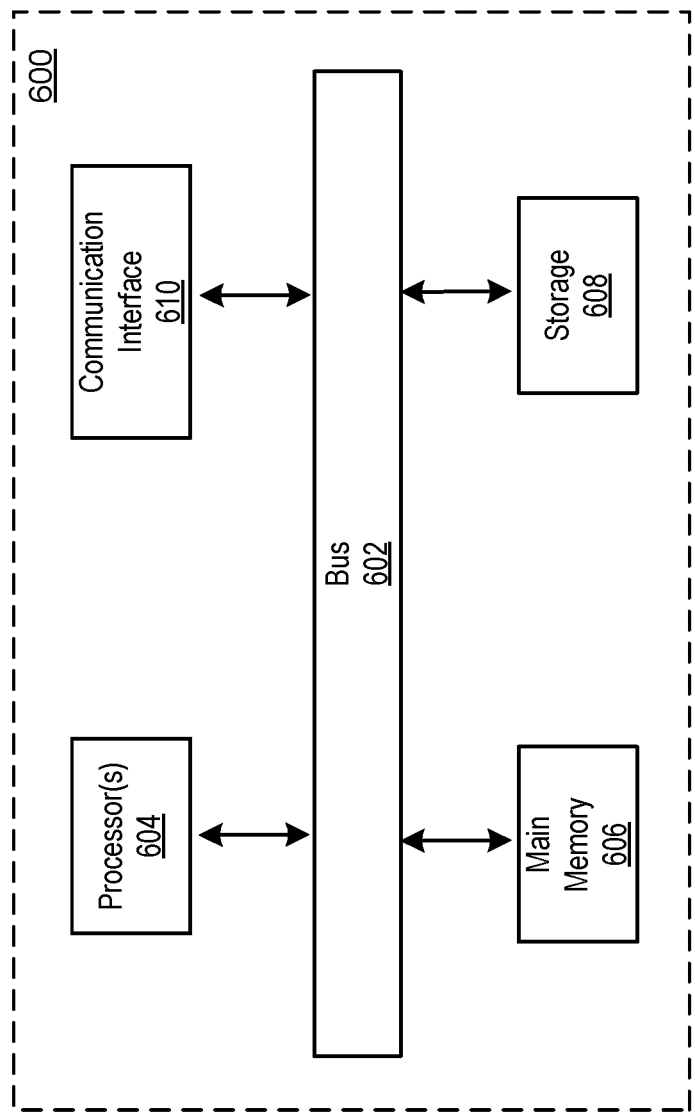
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor(s) 604. Main memory 606 also may be used for storing temporary variables or other intermediate information during execution of instructions to be executed by processor(s) 604. Such instructions, when stored in storage media accessible to processor(s) 604, render computer system 600 into a special-purpose machine that is customized to perform the operations specified in the instructions. Main memory 606 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 608. Execution of the sequences of instructions contained in main memory 606 causes processor(s) 604 to perform the process steps described herein.

For example, the computing system 600 may be used to implement the computing system 102 or one or more components of the computing system 102 shown in FIG. 1. As another example, the computing system 600 may be used to implement the multi-layer data model 400 or one or more layers of the multi-layer data model 400 shown in FIG. 4. As yet another example, the process/method shown in FIG. 5 and described in connection with this figure may be implemented by computer program instructions stored in main memory 606. When these instructions are executed by processor(s) 604, they may perform the steps as shown in FIG. 5 and described above. In alternative embodiments, hard-wired circuitry may be used in place of or in combination with software instructions.

The computer system 600 also includes a communication interface 610 coupled to bus 602. Communication interface 610 provides a two-way data communication coupling to one or more network links that are connected to one or more networks. As another example, communication interface 610 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A system for detecting security threats, the system comprising:
    one or more processors; and
    a memory storing instructions that, when executed by the one or more processors, cause the system to perform:
        obtaining event information of a computing device, the event information characterizing events occurring at the computing device;
        grouping two or more of the events into an event group, the event group defining an activity;
        classifying the event group to classify the activity using pattern recognition based on matching a hash of the event group to a recognizable hash among a list of recognizable hashes associated with a library of executables;
        chaining the activity and one or more related activities into a sequence in a graph, the sequence defining a behavior;
        adding context to the sequence to determine a contextual behavior; and
        detecting a security threat by comparing one or more portions of the graph of the sequence associated with the contextual behavior to one or more security threat graphs stored in a library.

2. The system of claim 1, wherein the events include operating system level events.

3. The system of claim 2, wherein the two or more of the events are grouped into the event group based on a common identifier associated with the two or more of the events.

4. The system of claim 3, wherein the common identifier is determined based on a process identifier and a device identifier.

5. The system of claim 1, wherein adding the context to the sequence includes adding external information to the graph.

6. The system of claim 5, wherein detecting the security threat based on the contextual behavior includes detecting the security threat based on at least a portion of the graph.

7. The system of claim 1, wherein the event information is obtained from an event collector agent running on the computing device.

8. The system of claim 1, wherein the detecting the security threat is further based on a machine learning model.

9. A method for detecting security threats, the method comprising:
    obtaining event information of a computing device, the event information characterizing events occurring at the computing device;
    grouping two or more of the events into an event group, the event group defining an activity;
    classifying the event group to classify the activity using pattern recognition based on matching a hash of the event group to a recognizable hash among a list of recognizable hashes associated with a library of executables;
    chaining the activity and one or more related activities into a sequence in a graph, the sequence defining a behavior;
    adding context to the sequence to determine a contextual behavior; and
    detecting a security threat by comparing one or more portions of the graph of the sequence associated with the contextual behavior to one or more security threat graphs stored in a library.

10. The method of claim 9, wherein the events include operating system level events.

11. The method of claim 10, wherein the two or more of the events are grouped into the event group based on a common identifier associated with the two or more of the events.

12. The method of claim 11, wherein the common identifier is determined based on a process identifier and a device identifier.

13. The method of claim 9, wherein adding the context to the sequence includes adding external information to the graph.

14. The method of claim 13, wherein detecting the security threat based on the contextual behavior includes detecting the security threat based on at least a portion of the graph.

15. The method of claim 9, wherein the event information is obtained from an event collector agent running on the computing device.

16. The method of claim 9, wherein the detecting the security threat is further based on a machine learning model.

17. A non-transitory computer-readable medium for detecting threats, the non-transitory computer-readable medium comprising instructions that, when executed, cause one or more processors to perform:
    obtaining event information of a computing device, the event information characterizing events occurring at the computing device;

grouping two or more of the events into an event group, the event group defining an activity;

classifying the event group to classify the activity using pattern recognition based on matching a hash of the event group to a recognizable hash among a list of recognizable hashes associated with a library of executables;

chaining the activity and one or more related activities into a sequence in a graph, the sequence defining a behavior;

adding context to the sequence to determine a contextual behavior; and detecting a security threat by comparing one or more portions of the graph of the sequence associated with the contextual behavior to one or more security threat graphs stored in a library.

18. The non-transitory computer-readable medium of claim 17, wherein:

the two or more of the events are grouped into the event group based on a common identifier associated with the two or more of the events;

adding the context to the sequence includes adding external information to the graph; and detecting the security threat based on the contextual behavior includes detecting the security threat based on at least a portion of the graph.

19. The non-transitory computer-readable medium of claim 17, wherein the detecting the security threat is further based on a machine learning model.

* * * * *